United States Patent
Garcia Blanco

(10) Patent No.: US 11,235,745 B2
(45) Date of Patent: Feb. 1, 2022

(54) CONNECTION DEVICE FOR VEHICLE HYDRAULIC SYSTEMS, ORIENTABLE CONNECTOR AND METHOD OF ASSEMBLY ASSOCIATED THEREWITH

(71) Applicant: J.JUAN, S.A., Gava (ES)

(72) Inventor: Joaquin Garcia Blanco, Gava (ES)

(73) Assignee: J.JUAN, S.A., Gava (ES)

( * ) Notice: Subject to any disclaimer, the term of this patent is extended or adjusted under 35 U.S.C. 154(b) by 0 days.

(21) Appl. No.: 16/923,278

(22) Filed: Jul. 8, 2020

(65) Prior Publication Data
US 2021/0024049 A1  Jan. 28, 2021

(30) Foreign Application Priority Data
Jul. 23, 2019 (EP) .................. 19382624

(51) Int. Cl.
*B60T 17/04* (2006.01)
*F16L 37/08* (2006.01)
*F16L 39/02* (2006.01)
*F16L 41/00* (2006.01)
*B60T 8/36* (2006.01)

(52) U.S. Cl.
CPC ......... *B60T 17/043* (2013.01); *F16L 37/082* (2013.01); *F16L 39/02* (2013.01); *F16L 41/005* (2013.01); *B60T 8/3685* (2013.01)

(58) Field of Classification Search
CPC ...... F16L 37/082; F02M 61/14; B60T 17/043; B60T 8/3685; B60T 17/02; B60T 17/046; B60T 15/36

USPC .... 285/124.12, 124.3, 124.4, 208, 185, 191, 285/139.1
See application file for complete search history.

(56) References Cited

U.S. PATENT DOCUMENTS

| | | | | |
|---|---|---|---|---|
| 2,326,213 | A * | 8/1943 | Gorrien | F16L 37/082 285/8 |
| 3,282,612 | A * | 11/1966 | Younger | F16L 39/00 285/124.2 |
| 3,869,152 | A * | 3/1975 | DeVincent | F16L 39/00 285/124.3 |
| 3,869,153 | A * | 3/1975 | De Vincent | F16L 39/02 285/124.3 |
| 5,820,167 | A * | 10/1998 | Linkner, Jr. | F16L 39/00 285/124.1 |
| 6,269,798 | B1 * | 8/2001 | Takahashi | F02M 61/14 123/469 |
| 6,682,100 | B2 * | 1/2004 | Wood | F16L 39/00 285/26 |

(Continued)

*Primary Examiner* — David Bochna
(74) *Attorney, Agent, or Firm* — Lucas & Mercanti, LLP

(57) ABSTRACT

A connection device for vehicle hydraulic systems having a receiver block is provided, which has one or more connection holes; at least one orientable connector which has an input and/or output section and a connection end; and a fixing plate configured to fix the orientable connector to the receiver block. Where the orientable connector has a head provided with orientation means arranged between the input and/or output section and the connection end; and where the fixing plate has complementary orientation means configured to fit with the orientation means of the head to fix an orientation position (P₃) of the orientable connector, the head being arranged between the fixing plate and the receiver block.

8 Claims, 18 Drawing Sheets

(56) References Cited

U.S. PATENT DOCUMENTS

| | | | | |
|---|---|---|---|---|
| 6,751,978 B1* | 6/2004 | Gagne | .................... | E03B 7/074 |
| | | | | 285/124.4 |
| 7,469,934 B2* | 12/2008 | Inaba | .................... | F16L 39/00 |
| | | | | 285/124.3 |
| 8,511,717 B2* | 8/2013 | Fulmer | ................ | B60T 17/043 |
| | | | | 285/191 |
| 8,991,872 B2* | 3/2015 | Mahrenholz | ............ | F16L 39/00 |
| | | | | 285/124.3 |
| 10,280,994 B2* | 5/2019 | Kaneko | ................ | B60T 17/043 |
| 2018/0056966 A1* | 3/2018 | Atsushi | ................ | B60T 17/043 |

* cited by examiner

CONNECTION DEVICE FOR VEHICLE HYDRAULIC SYSTEMS, ORIENTABLE CONNECTOR AND METHOD OF ASSEMBLY ASSOCIATED THEREWITH

CROSS REFERENCE TO RELATED APPLICATION

This application claims the benefit of priority of European Patent Application No. 19382624.5, filed on Jul. 23, 2019, which is incorporated herein by reference.

FIELD OF THE INVENTION

The present invention relates to a connection device for vehicle hydraulic systems in general, such as brake systems, damping systems, cooling systems, stability control systems, etc., and more specifically for hydraulic distributors or control units of wheel anti-lock braking systems (ABS) in motorcycles.

TECHNICAL FIELD

The present invention also relates to an orientable connector for vehicle hydraulic systems and a method of assembly for rapidly connecting vehicle hydraulic systems associated with said connection device.

BACKGROUND OF THE INVENTION

The connection devices for conducting fluids in the hydraulic systems mentioned should ensure the correct supply of the fluid to the different components of the system, at the same time providing the working pressure and possible overpressures to avoid any type of failure or leak which may affect the correct functioning of the system and/or put the safety of the users at risk.

In general, these systems comprise a significant number of connections between the different components of the same. For example, between two transport elements of the fluid (rigid tubes, flexible hoses, etc.), between a transport element and a functional element (hydraulic pump, brake caliper, damper, ABS, etc.), between other connections. At the same time, while the vehicles are increasingly more complex, the integration of these systems therein becomes more difficult and complicated. The lack of space, the variety of elements to be connected and/or the high number of connections to be made makes the assembly work of these system considerably difficult.

The document EP3104056A1 shows a connector for conducting fluids which facilitates the connection between the elements of the system during its assembly in the vehicle. Said connector comprises a first connection end configured to be inserted within a second connection end according to an axial axis for connecting both ends. The first connection end in turn comprises a circular groove, concentric to the axial axis, which makes up a first recess, while the second connection end comprises a connector hole, which makes up a second recess facing the first recess when both ends are connected, and a retaining element configured to be inserted through the connector hole and be housed between the first recess and the second recess to keep the first connection end attached to the second connection end when both ends are connected.

In spite of the advantages provided by the connector of document EP3104056A1, it should be indicated that its use is especially intended for connections in which the connection ends are aligned to one another, once connected, without any change of direction or orientation of the same being produced, such that the elements with which they are associated do not usually have a predetermined mounting position. For this reason, said connector allows the first connection end to be inserted within the second connection end at any position and consequently, a relative rotational movement is produced between both ends, once attached, owing to the circular groove of the first connection end. At the same time, said aligned connection means that the application of this connector is especially intended for the connection of two ends.

However, in the automotive sector and especially in the field of motorcycle brake systems, such as the wheel anti-lock braking systems (ABS), many of the elements associated with the same are designed to be mounted in a predetermined position. That is to say, they only permit a single mounting position so as not to interfere with other components of the vehicle (such as the frame, chassis, fork, engine, handlebars, wheel, etc.). Therefore, the connectors that do not have a single connection position between the connection ends associated with said elements can end up causing mounting errors during the assembly of the vehicle and/or slow down the mounting until the operator finds the correct connection position.

The document ES1203412U relates to a connector for conducting fluids, which configuration means that a single insertion position of a first connection end within a second end can be fixed, thus avoiding a subsequent relative rotational movement between both ends once attached. Owing to this, the assembly operations of the vehicle are considerably facilitated, the mounting times of the elements of said systems are reduced and the risk of said elements being mounted in an incorrect position is eliminated.

In spite of the notable advantages provided by the connector of document ES1203412U, it requires the use of both retaining elements and connections between two ends. Where each one of these retaining elements works in cooperation with a straight running side spring mechanised specifically at each one of the first ends, in accordance with the orientation conditions intended for said end once assembled in the vehicle. In addition, the method of assembly requires the operator, once the first end has been inserted in the second end, to look for the fitting position between the retaining element and the side spring, rotating said first end until the fit is established without further visual help.

The object of the present invention is a connection device for vehicle hydraulic systems which allows said retaining elements and specific mechanised elements for each connector to be omitted owing to the use of an orientable connector and a fixing plate provided with orientation means which work together, said fixing plate also being common for all the orientable connectors that connect to the hydraulic distributor (control unit) and/or to any other element of said system. Where said orientation means are arranged visible to the operator during the mounting with the aim of allowing quick assembly of the same. Where each one of said connectors is assembled safely in a specific, generally single, orientation position designed for said hydraulic system in question and without the possibility of rotating once assembled.

The present invention also relates to an orientable connector for hydraulic systems and to a method of connection associated with said connection device.

DESCRIPTION OF THE INVENTION

The connection device for vehicle hydraulic systems of the present invention comprises:

a receiver block which has one or more connection holes;

at least one orientable hydraulic connector which has an input and/or output section and a connection end configured to be inserted into a connection hole to establish hydraulic communication between the receiver block and the orientable connector; and a fixing plate configured to fix the orientable connector to the receiver block.

The orientable connector comprises a head provided with orientation means arranged between the input and/or output section and the connection end and configured to establish hydraulic communication between both. At the same time, the fixing plate comprises complementary orientation means configured to fit with the orientation means of the head to fix an orientation position of the orientable connector, the head being arranged between the fixing plate and the receiver block.

Thus, the orientation means of the head, in cooperation with the complementary orientation means of the fixing plate, determine the output or orientation angle of the orientable connector. Said orientation is preferably a single orientation, that is to say, such that there is only one fitting position that allows the connection of the orientable connector to the receiver block. This prevents the connector being incorrectly connected to the receiver block, that is to say, in an orientation position which does not correspond to the design, mounting and/or application in question. At the same time, given that the operator must only note that both elements fit, further checks and/or readjustments are not required, therefore, the method of assembly is quicker.

However, in particular cases, the orientation of the orientable connector can permit a determined number of fitting positions greater than one. For example, permitting some symmetric positions (e.g. 0° and 180°) or permitting various positions according to a specific angle (e.g. 90°). In this way, there is also a certain compatibility of the components of the device for a determined number of mounting positions of the same which also means that the risk of incorrect assembly and the connection time are reduced.

Once the orientable connector is connected and fixed to the receiver block, the head of said connector is firmly secured between the fixing plate and the receiver block. This allows both the hydraulic working pressure and possible overpressures to be supported, preventing any type of failure or leak which may affect the correct functioning of the system and/or put the safety of the users of the vehicle at risk.

As the head of the orientable connector is situated below the fixing plate, the pressure exerted by the surface of the fixing plate on said head can be distributed better, favouring the correct securing of the connector even further.

The head can adopt various constructive configurations, for example in the form of a cube, prism (square, hexagon, etc.), cylinder, polyhedral or combinations of the same, amongst others.

Although, the head preferably comprises:

a flat support face from which the connection end extends perpendicularly; and a flat orientation face, opposite the flat support face, on which the orientation means are located.

In this way, the head is trapped between flat surfaces, greater pressure on the same being possible. Specifically, the flat surface of the fixing plate presses against the flat surface of the orientation face, while the flat surface of the support face presses against the flat surface of the receiver block in which the connection holes are located.

The head also comprises:

at least one curved side face arranged between the flat support face and the flat orientation face.

The presence of one or more curved or tapered side faces allows the width and/or size of the head to be reduced, such that once connected to the receiver block, a greater space is produced between them. The greater the space between the heads of the connectors, the greater the number of fixing elements (for example; screws, rods, threads, etc.) can be provided between them to fix the fixing plate to the receiver block.

The orientation means of the orientable connector and the complementary orientation means of the fixing plate can also adopt various constructive embodiments, provided they can work in cooperation together to fix a single orientation position of the orientable connector or a specific number of the same as commented above. The orientation means preferably comprise a protruding element, while the complementary orientation means comprise an orientation hole, where the protruding element is configured to fit in the orientation hole in the orientation position of the orientable connector, without the possibility of said orientable connector rotating once fitted.

The protruding element can adopt various constructive configurations for fitting without the possibility of rotating in the orientation hole. For example, adopting a prismatic configuration (with a triangular, square, pentagonal, hexagonal contour, etc.), cylindrical configuration (e.g. elliptical, partially circular contour, etc.), or any contour formed by a combination of straight and curved sections. In any case, the exterior contour of the protruding element should partially or fully coincide with the interior contour of the orientation hole.

Preferably, the connection end of the orientable connector is arranged substantially perpendicular with respect to the input and/or output section. This configuration facilitates the process of inserting the connection end into the corresponding connection hole of the receiver block for the operator and at the same time leaves the orientation face of the head free to arrange and/or place the fixing plate on the same.

According to other particular embodiments, the connection end and the input and/or output section can be arranged forming an angle greater than 90° and less than 180° with respect to its longitudinal axes, preferably between 90 and 135°, as the head can also be arranged between the fixing plate and the receiver block, once the orientable connector is connected and fixed to said receiver block.

The fixing means which allow the fixing plate to be fixed to the receiver block can adopt different constructive configurations, for example screws, rods, threads, threaded studs, nuts, bolts, clipping elements, etc.

However, for greater simplicity and ease of mounting, the fixing means preferably comprise the use of one or more fixing screws which work in cooperation with the fixing plate and the receiver block. To this end, the receiver block comprises one or more threaded holes, each one configured to allow the threading of a first end of a fixing screw, while the fixing plate comprises one or more through-holes, each one configured to allow the passage of the first end of a fixing screw and retain a second end of said fixing screw, said second end being the head of the screw.

The device of the present invention can adopt various constructive and/or mounting configurations depending on many factors such as the functional design of the vehicle, the space available for the placement of the device, the number of channels of the device, the number of orientable connectors connected to the same, the presence or absence of other additional connectors (for example, connectors without orientation), etc.

Preferably, for the case of devices which also have one or more connectors without orientation, the fixing plate comprises at least one opening configured to receive a connector without orientation. The connectors without orientation are understood as connectors which do not have a specific orientation position for the design in question, that is to say, which can be connected to the device in any position. Normally, they are connectors in which their connection end is aligned with the axial axis of the input and/or output section.

Preferably, the receiver block is a control unit of a wheel anti-lock braking system (ABS) or a control unit of a stability control system of a vehicle, for example a motorcycle.

The orientable connector for connection devices of vehicle hydraulic systems of the present invention comprises an input and/or output section and a connection end. Said orientable connector is characterised in that it comprises a head provided with orientation means, arranged between the input and/or output section and the connection end and configured to establish hydraulic communication between both.

The head can adopt various constructive configurations, for example; in the form of a cube, prism (square, hexagon, etc.), cylinder, polyhedral or combinations of the same, amongst others.

Although the head preferably comprises:
  a flat support face from which the connection end extends perpendicularly; and
  a flat orientation face, opposite the flat support face, on which the orientation means are located.

The head also comprises:
  at least one curved or tapered side face arranged between the flat support face and the flat orientation face.

Preferably, the orientation means comprise a substantially prismatic or cylindrical protruding element. The protruding element can adopt various constructive configurations, for example, adopting a prismatic configuration (with a triangular, square, pentagonal, hexagonal contour, etc.), cylindrical configuration (e.g. with an elliptical, partially circular contour, etc.) or any contour formed by a combination of straight and curved sections.

Preferably, the connection end of the orientable connector is arranged substantially perpendicular with respect to the input and/or output section.

According to other particular embodiments, the connection end and the input and/or output section can be arranged forming an angle greater than 90° and less than 180° with respect to its longitudinal axes, preferably between 90 and 135°.

The method of assembly of the connection device of the present invention comprises the steps of:
  a) inserting the connection end of the orientable connector into a connection hole of the receiver block to establish hydraulic communication between the receiver block and the orientable connector; and
  b) fixing the orientable connector to the receiver block by means of the fixing plate.

Said method is characterised in that step b) comprises the following steps:
  b1) arranging the head of the orientable connector between the fixing plate and the receiver block;
  b2) fitting the orientation means of the head with the complementary orientation means of the fixing plate to establish an orientation position of the orientable connector; and
  b3) fixing the fixing plate to the receiver block, the orientable connector being in the orientation position.

The insertion of the connection end is carried out easily and quickly, as it is carried out prior to using the fixing plate. Therefore, the operator finds themselves with a receiver block whose connection holes are very accessible since they are free from other mounting and/or fixing elements which may impede and/or make difficult the insertion of the connection end.

In the same way, when the subsequent fixing of the orientable connector to the receiver block is carried out by means of the fixing plate, the orientable connectors are already connected to the receiver block, consequently their heads are also free of other elements that make the placement of the fixing plate difficult.

The fitting of the orientation means of the head with the complementary orientation means of the fixing plate is also carried out quickly and simply. As said orientation means are arranged very visible to the operator during the mounting. To carry out the fitting, it is simply sufficient to position the fixing plate on the heads of the orientable connectors and slightly rotate them until the fitting is produced. Once fitted, the orientable connectors are oriented without the possibility of rotating in the orientation position specific for the application and/or design in question without requiring further checks and/or readjustments by the operator.

Lastly, the fixing plate is fixed to the receiver block, each one of the orientable connectors being in its corresponding orientation position. For greater simplicity and ease of mounting, fixing means are preferably used which comprise the use of one or more fixing screws which work in cooperation with the fixing plate and the receiver block.

To facilitate the work of the operator even further, step b2) preferably comprises the following step:
  b2.1) fitting a protruding element of the orientation means into an orientation hole of the complementary orientation means without the possibility of said orientable connector rotating once fitted.

The method has been described for the assembly of a connection device which comprises at least one orientable connector. For connection devices with more orientable connectors, step a) is simply repeated for the rest of the orientable connectors, before proceeding with step b). The rest of steps b1), b2), b3) and b2.1) are carried out in the same way for each one of the orientable connectors.

BRIEF DESCRIPTION OF THE DRAWINGS

A series of drawings will be described below very briefly which will aid a better understanding of the invention and they expressly relate to various embodiments of the same which are presented as non-limiting examples thereof.

DETAILED DESCRIPTION OF THE INVENTION

Figure 1:
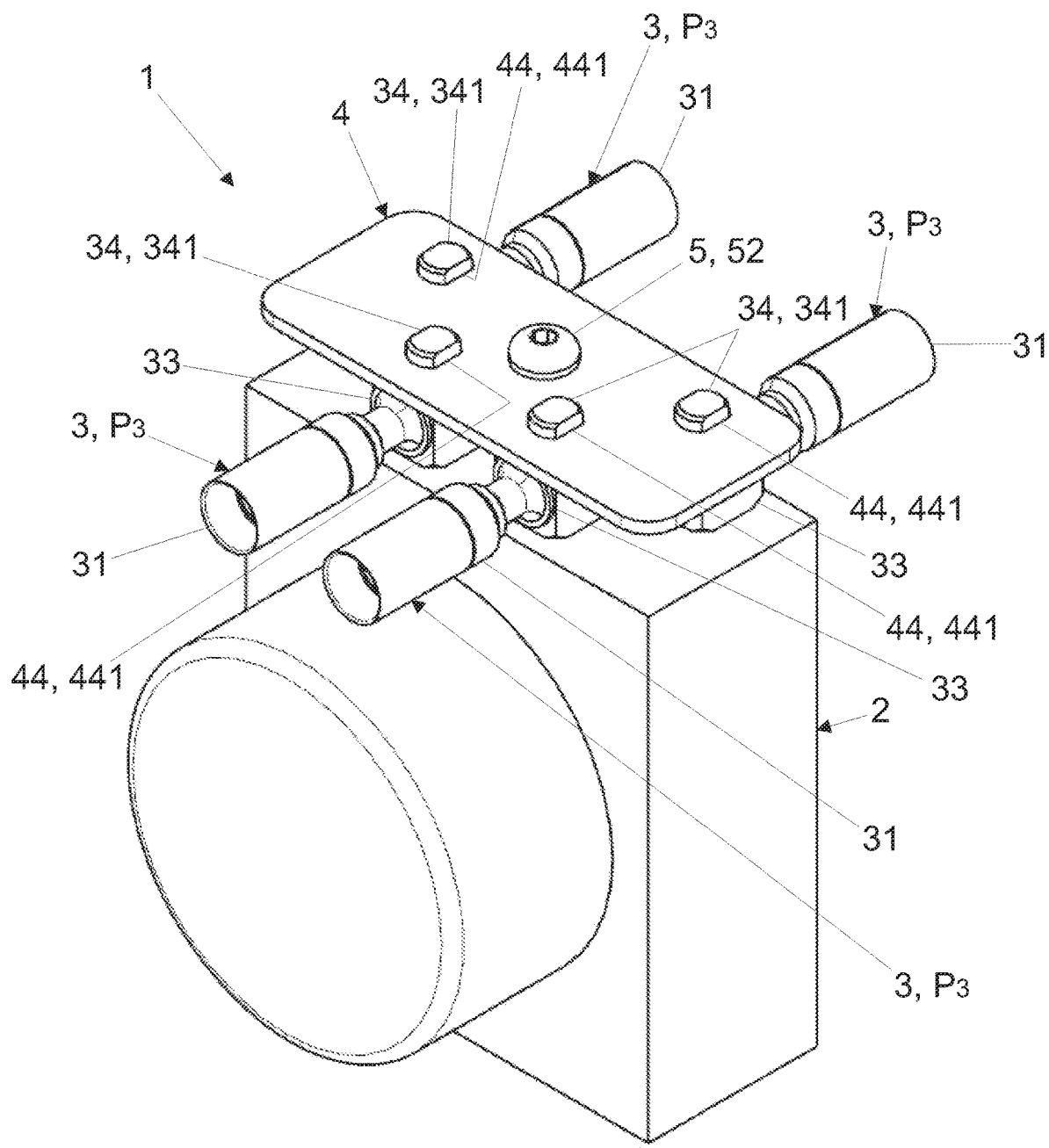
FIG. 1 represents a perspective view of the connection device of the present invention according to a first exemplary embodiment.
Figure 2:
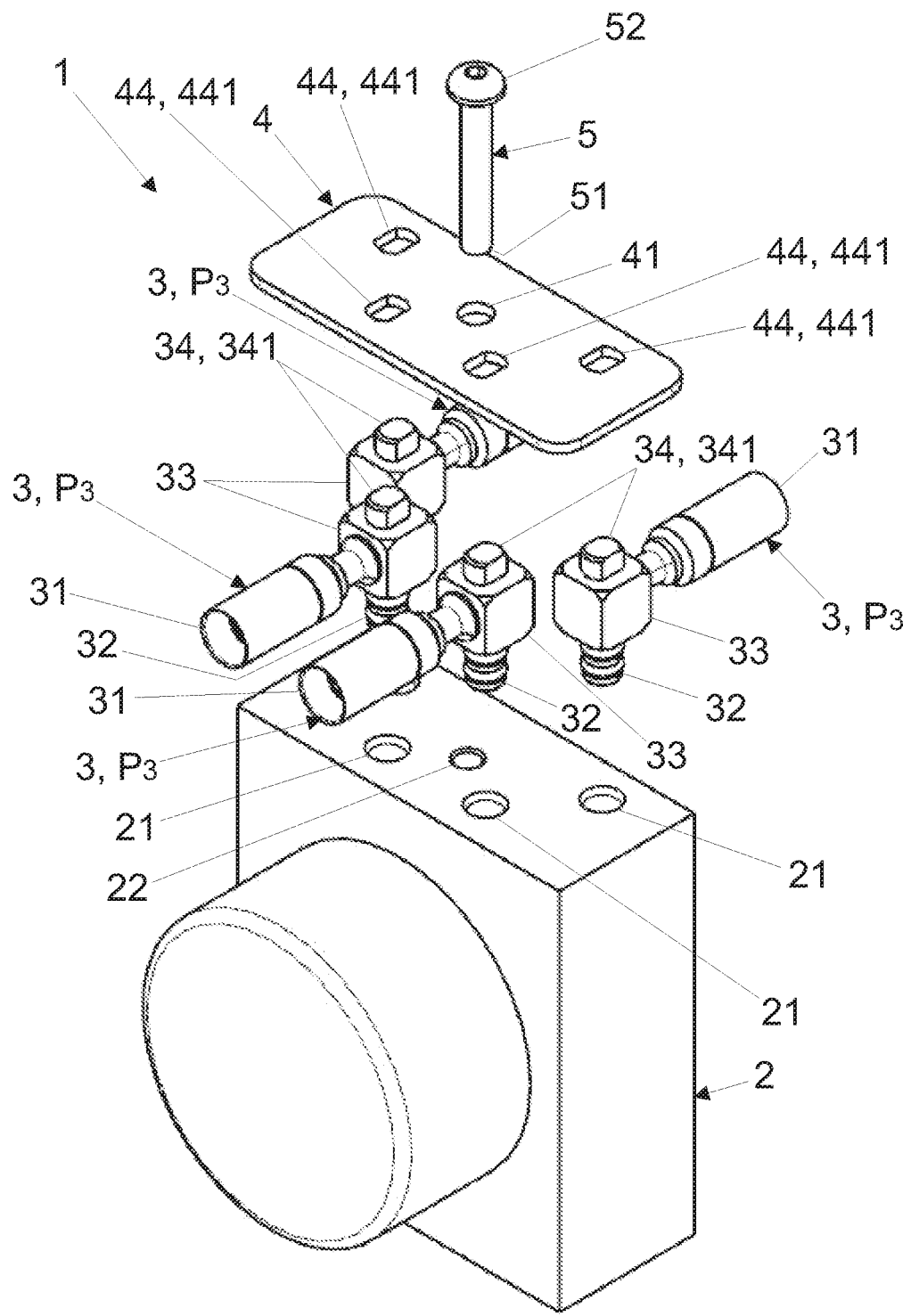
FIG. 2 represents an exploded view of the connection device of FIG. 1.

FIGS. 1 and 2, respectively, represent a perspective view and an exploded view of the connection device (1) for vehicle hydraulic systems of the present invention according to a first exemplary embodiment. In this case, showing a receiver block or control unit (2) with two channels, to which four orientable connectors (3) connect in an orientation position ($P_3$) specific for each one.

Figure 3:
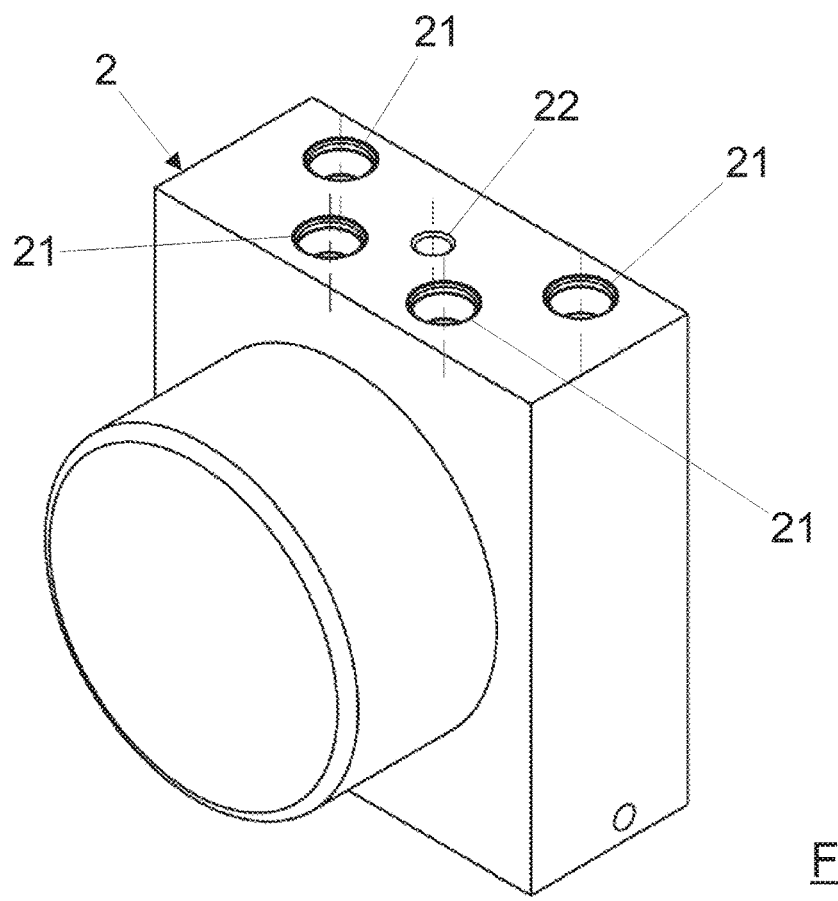
FIG. 3 represents a perspective view of the receiver block of the connection device of FIG. 1.
Figure 4:
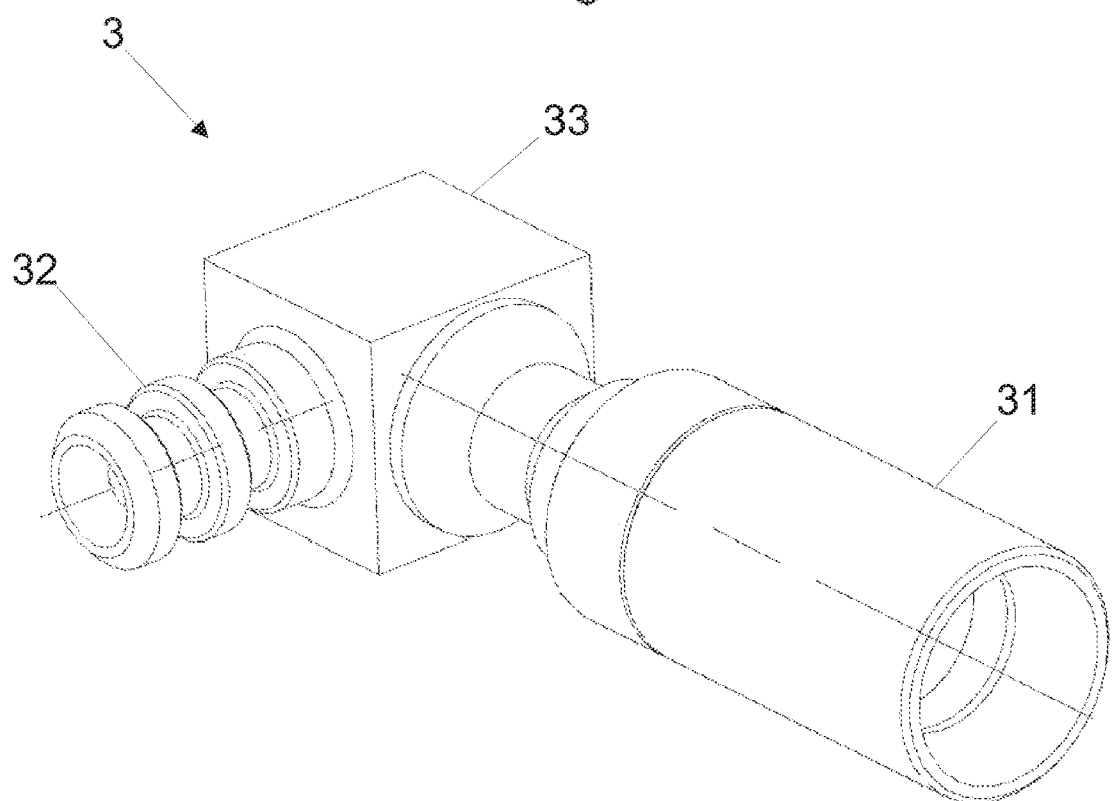
FIG. 4 represents a perspective view of the orientable connector of the present invention.
Figure 6:
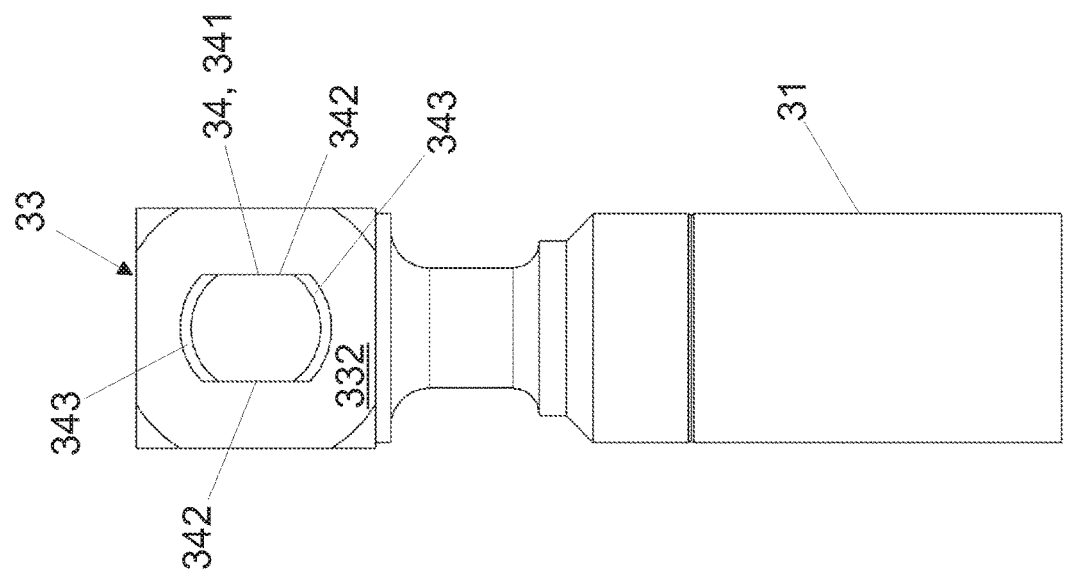
FIG. 6 represents an upper plan view of the orientable connector of FIG. 4.
Figure 5:
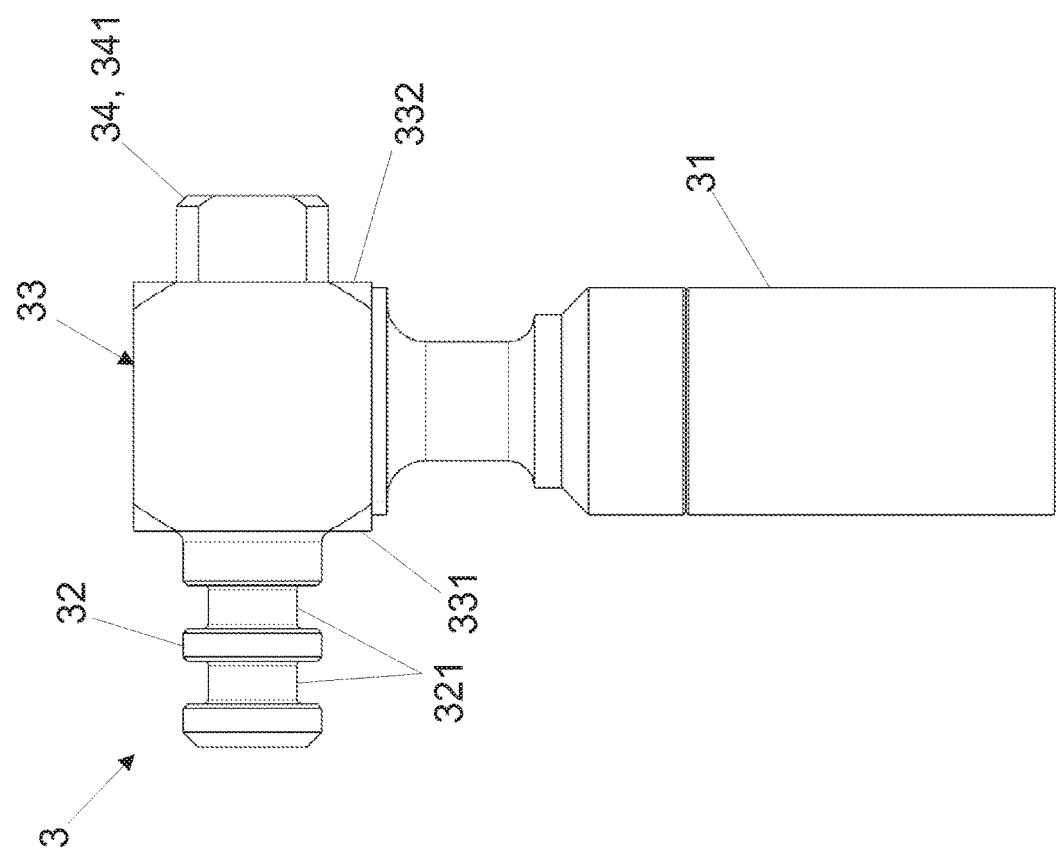
FIG. 5 represents a side view of the orientable connector of FIG. 4.

As can be seen in FIGS. 1 and 2, the connection device (1) comprises:
- a receiver block (2) which has four connection holes (21), FIG. 3;
- four orientable hydraulic connectors (3), each one of which has an input and/or output section (31), and a connection end (32) configured to be inserted into the corresponding connection hole (21) with the aim of establishing hydraulic communication between the receiver block (2) and the orientable connector (3); and
- a fixing plate (4), preferably metal, configured to fix the orientable connector (3) to the receiver block (2).

Each orientable connector (3) comprises a head (33) provided with orientation means (34) arranged between the input and/or output section (31) and the connection end (32) and configured to establish hydraulic communication between both (31, 32). At the same time, the fixing plate (4) comprises complementary orientation means (44) configured to fit with the orientation means (34) of the head (33) to fix an orientation position ($P_3$) of the orientable connector (3), the head (33) being arranged between the fixing plate (4) and the receiver block (2).

Thus, the orientation means (34) of the head (33), in cooperation with the complementary orientation means (44) of the fixing plate (4), determine the output or orientation angle of the orientable connector (3). According to the present example, the output of the orientable connectors (3) is carried out perpendicular to the receiver block (2) with respect to the front face (0°) and to the rear face of the same (180°). Therefore, in this case, the orientable connectors (3) can fit into symmetric positions of 0° and 180°.

The fixing means, which allow the fixing plate (4) to be fixed to the receiver block (2), comprise the use of a fixing screw (5) which works, in cooperation with the fixing plate (4) and the receiver block (2). To this end, the receiver block (2) comprises a threaded hole (22), FIG. 3, configured to allow the threading of a first end (51) of the fixing screw (5), while the fixing plate (4) comprises a through-hole (41) configured to allow the passage of the first end (51) of the fixing screw (5) and retain a second end (52) of said fixing screw (5), said second end (52) being the head of the screw.

Once the orientable connectors (3) are connected to the receiver block (2), the orientation means (34) of the head (33) fitted with the complementary orientation means (44) of the fixing plate (4) and said fixing plate (4) fixed to the receiver block (2) by means of the fixing screw (5), the heads (33) of said connectors (3) are firmly secured between the fixing plate (4) and the receiver block (2), maintaining the four orientable connectors (3) in their specific orientation position ($P_3$).

FIG. 3 represents a perspective view of the receiver block (2) of the connection device (1) of FIG. 1. Said figure shows in greater detail the four connection holes (21) configured to receive, each one of them, a connection end (32) of an orientable connector (3), and the threaded hole (22) which allows the fixing plate (4) to be fixed to the receiver block (2).

As can be seen in FIGS. 4 to 7, the orientable connector (3) for connection devices of vehicle hydraulic systems of the present invention comprises an input and/or output section (31) and a connection end (32).

Said orientable connector (3) is characterised in that it comprises a head (33) provided with orientation means (34) arranged between the input and/or output section (31) and the connection end (32) and configured to establish hydraulic communication between both (31, 32). According to the present example, the head (33) has a substantially cube configuration.

The head (33) comprises:
- a flat support face (331) from which the connection end (32) perpendicularly extends; and
- a flat orientation face (332), opposite the flat support face (331), on which the orientation means (34) are located.

The orientation means (34) comprise a protruding element (341) which has a configuration mixed between a square prism and a cylinder, having two flat side walls (342) arranged between two curved side walls (343).

The connection end (32) of the orientable connector (3) is arranged substantially perpendicular with respect to the input and/or output section (31).

The connection end (32) comprises one or more circular grooves (321) concentric to its axial axis, configured to house rubber O-rings, not illustrated, configured to ensure the leak-tightness and/or sealing of the connection of the orientable connector (3) to the receiver block (2).

Figure 8:
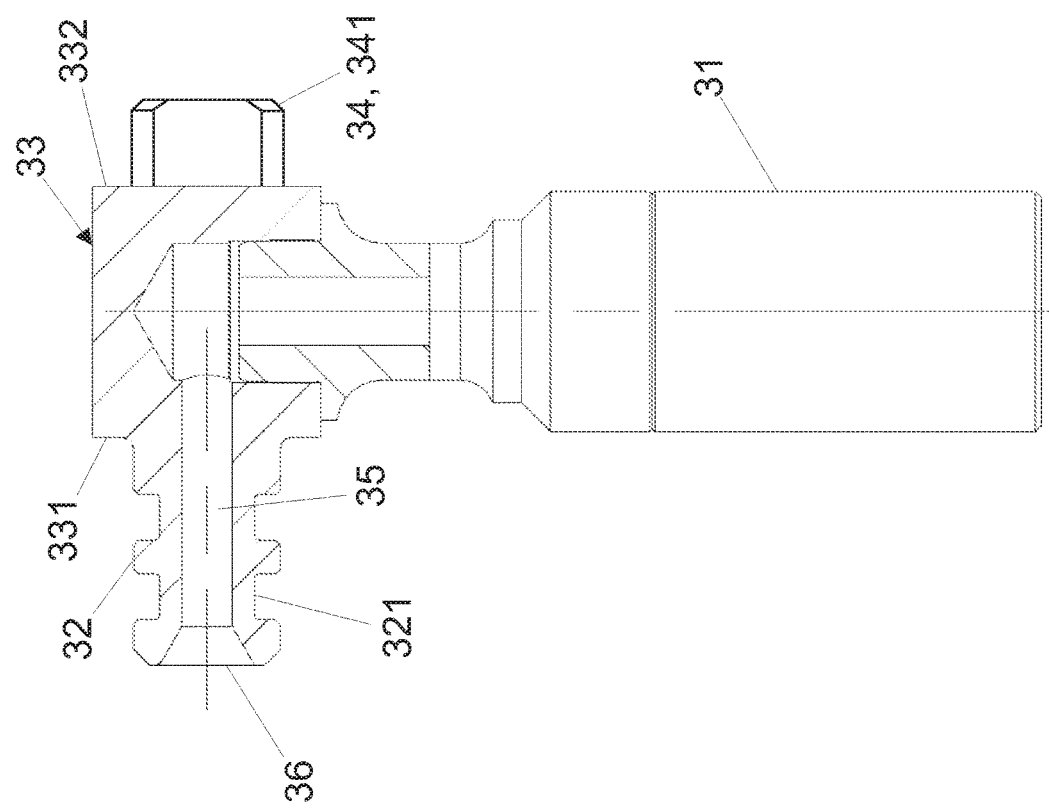
FIG. 8 represents a partially sectioned side view of the orientable connector of FIG. 4.
Figure 7:
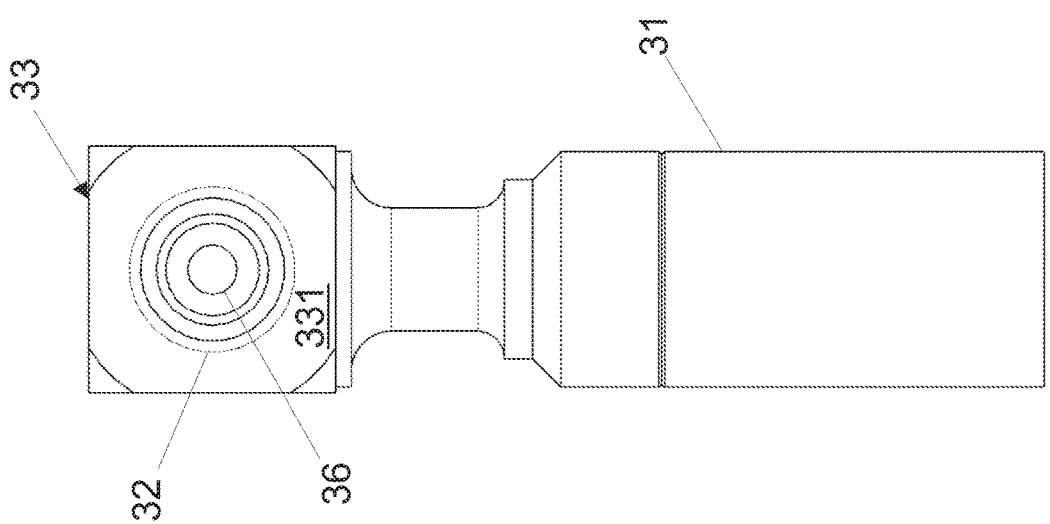
FIG. 7 represents a lower plan view of the orientable connector of FIG. 4.

As can be seen in FIG. 8, the orientable connector (3) comprises interior ducts (35) enabling the circulation of a fluid which allows hydraulic communication to be established between the input and/or output section (31) and the input and/or output mouth (36) arranged at the connection end (32).

Figure 9:
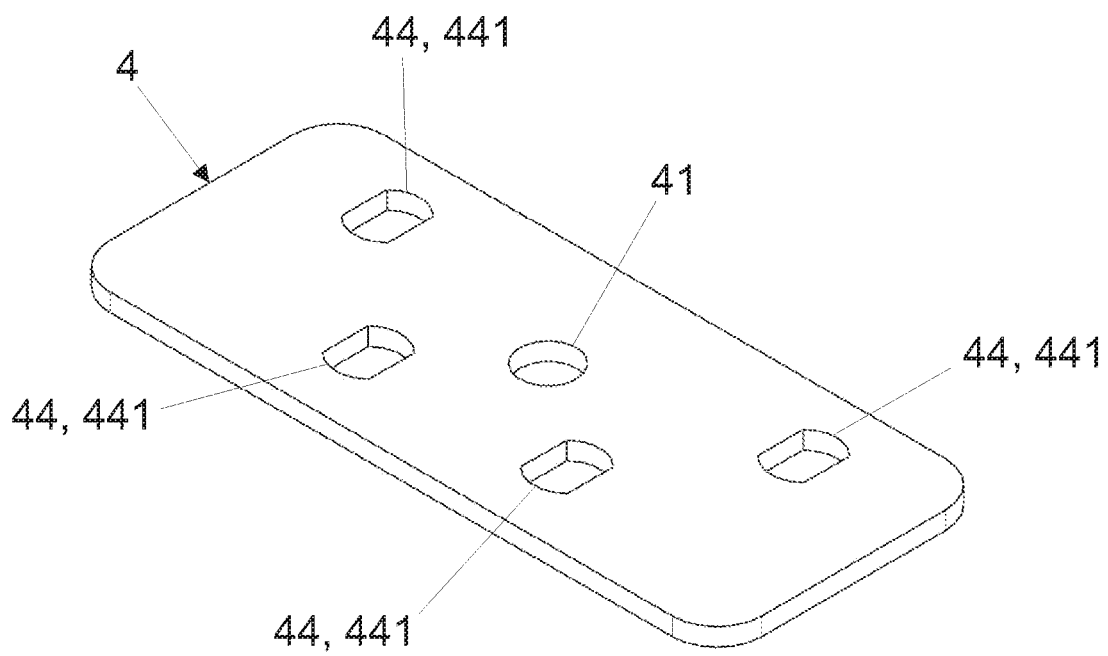
FIG. 9 represents a perspective view of the fixing plate of the connection device of FIG. 1.
Figure 10:
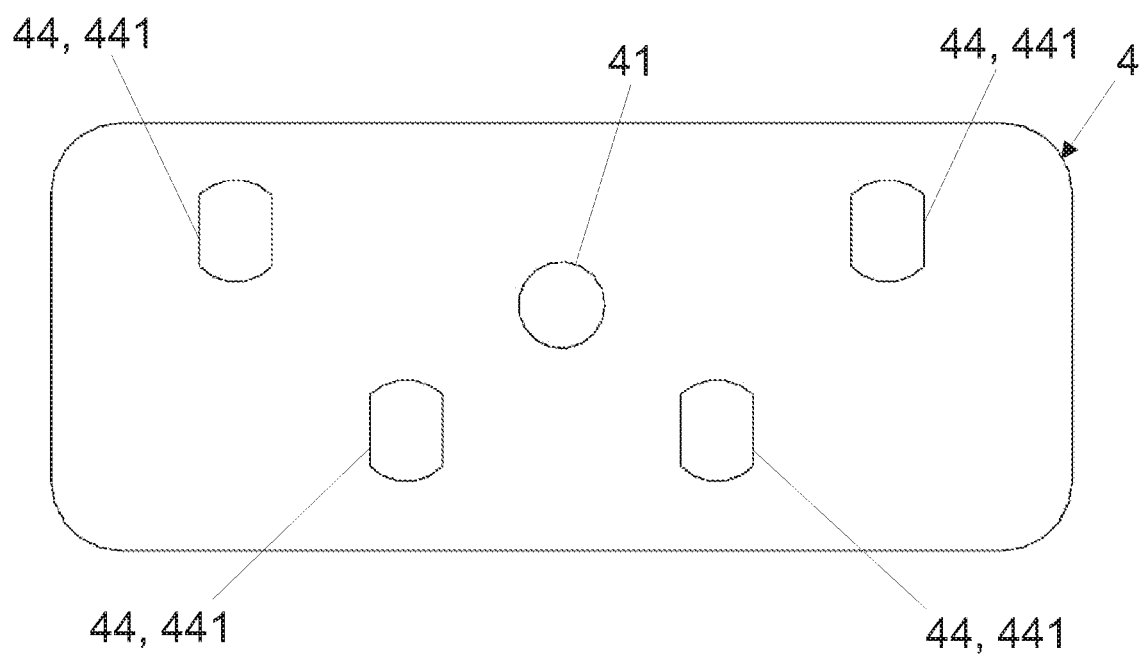
FIG. 10 represents an upper plan view of the fixing plate of FIG. 9.

As can be seen in FIGS. 9 and 10, the fixing plate (4) comprises complementary orientation means (44) configured to fit with the orientation means (34) of the head (33) to fit an orientation position ($P_3$) of the orientable connector (3).

According to the present exemplary embodiment, the complementary orientation means (44) comprise four orientation holes (441) in each of which the protruding element (341) of the corresponding orientable connector (3) fits in the orientation position ($P_3$) of the same without allowing the rotation of said orientable connector (3) once fitted. The exterior contour of the protruding element (341) coincides with the interior contour of the orientation hole (441) so that they fit suitably and tightly to maintain the orientation position ($P_3$).

The fixing plate (4) comprises a through-hole (41) configured to allow the passage of the first end (51) of the fixing screw (5) and retain the second end or head (52) of said fixing screw (5).

Figure 11:
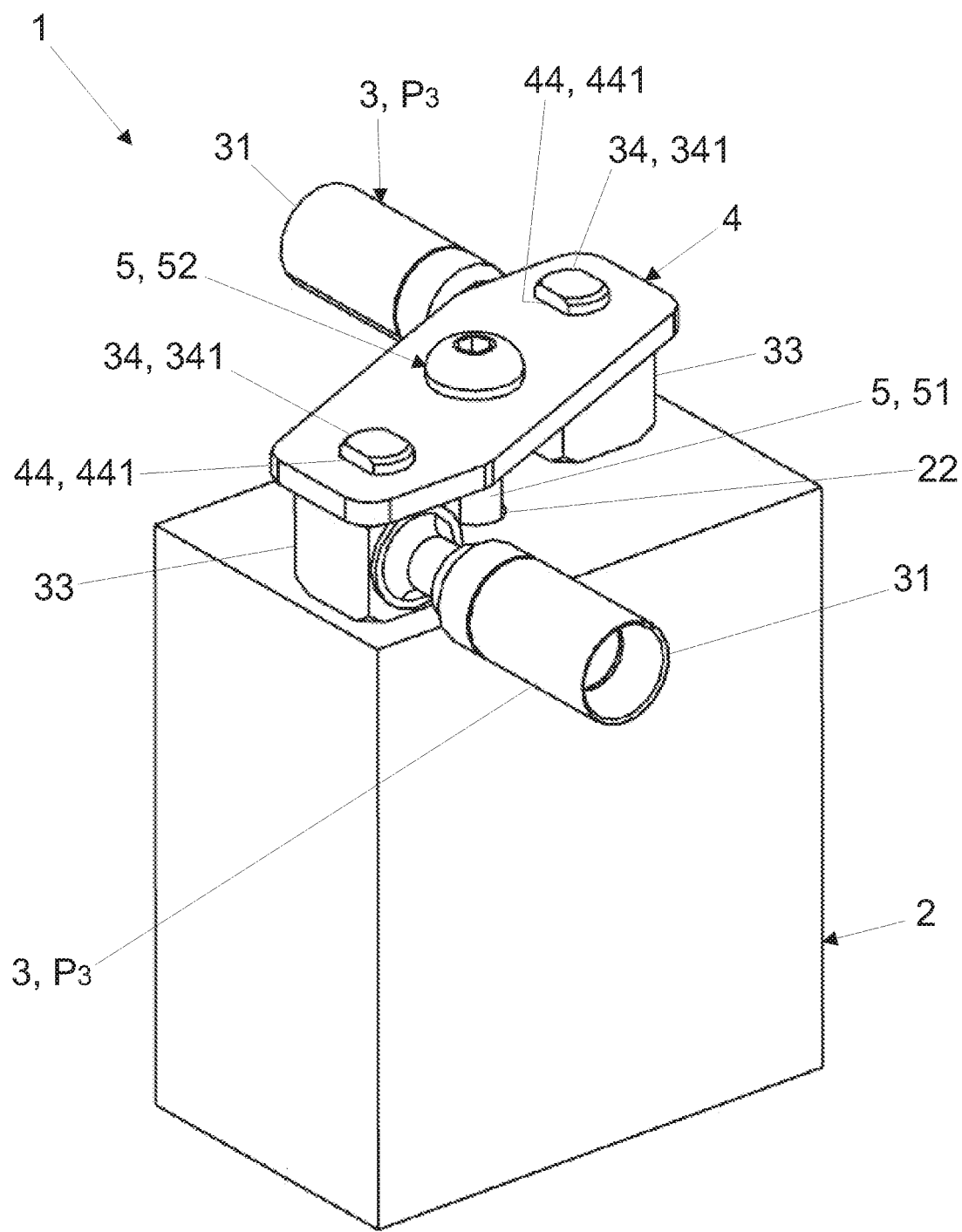
FIG. 11 represents a perspective view of the connection device of the present invention according to a second exemplary embodiment.

FIG. 11 represents a perspective view of the connection device (1) for vehicle hydraulic systems of the present invention according to a second exemplary embodiment. In this case, showing a receiver block or control unit (2) with one channel to which two orientable connectors (3) connect in an orientation position ($P_3$) specific for each one of them.

As can be seen, the fixing plate (4) has a geometry and/or constructive configuration especially adapted to be used with two orientable connectors (3), having a more reduced and optimised size to occupy the smallest possible space in the connection device (1). Given that the fixing plate (4) is passed through perpendicularly by the fixing screw (5) and at least by one protruding element (34), in this case two, they block and/or impede any rotational movement both of the fixing plate (4) itself and of the orientable connectors (3), once they are fixed to the support block (2).

Figure 12:
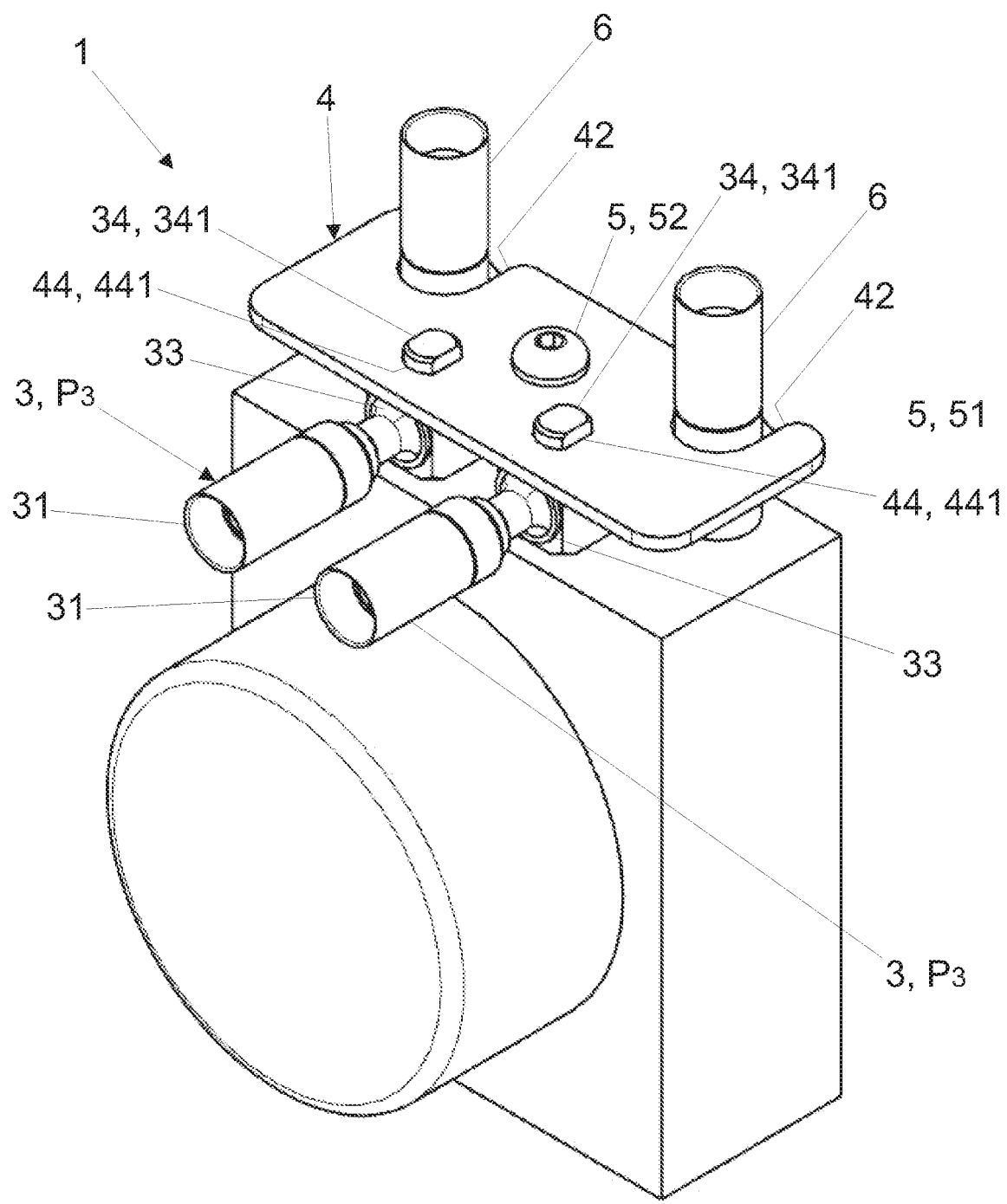
FIG. 12 represents a perspective view of the connection device of the present invention according to a third exemplary embodiment.
Figure 13:
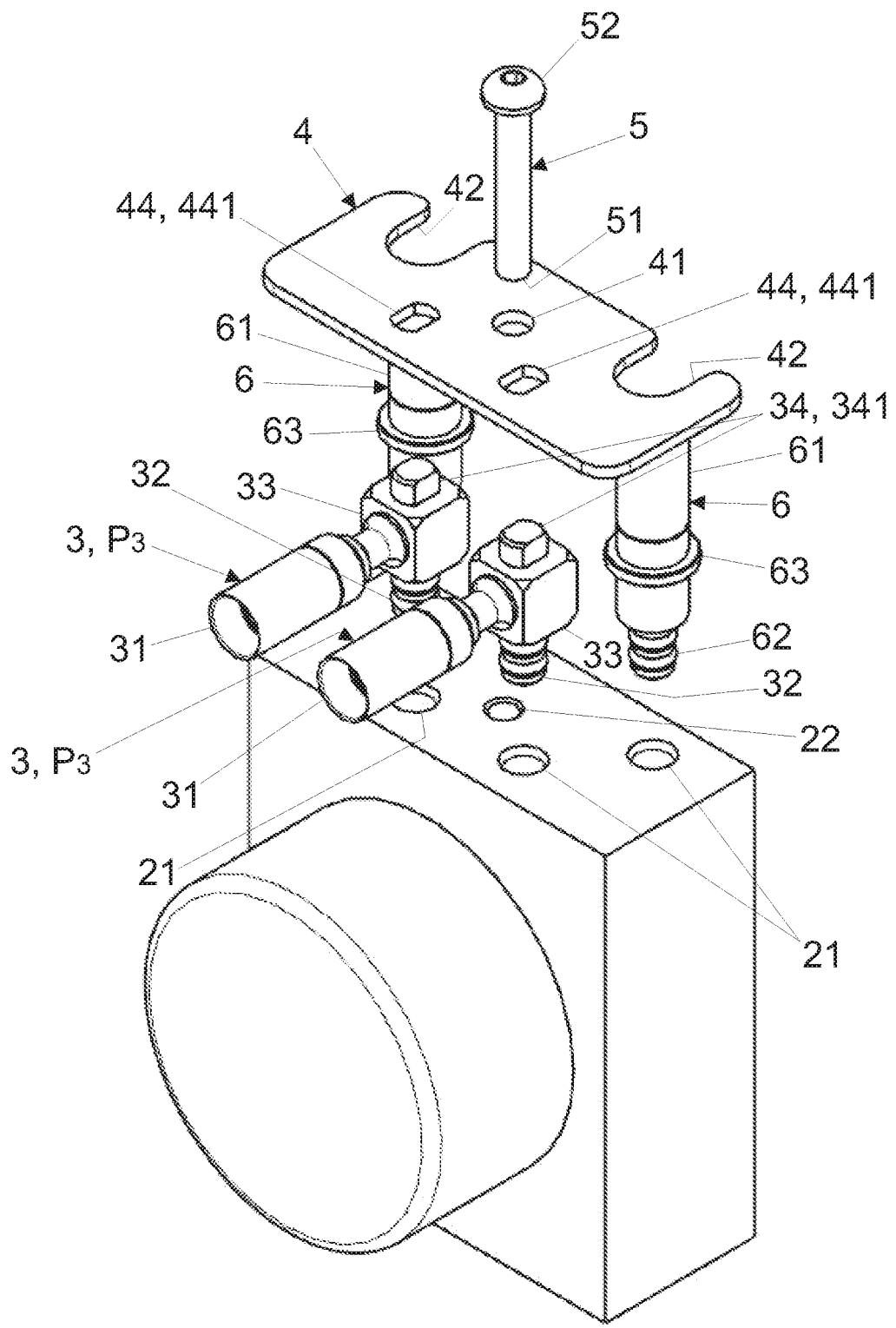
FIG. 13 represents an exploded view of the connection device of FIG. 12.

FIGS. 12 and 13, respectively, represent a perspective view and an exploded view of the connection device (1) for vehicle hydraulic systems of the present invention according to a third exemplary embodiment. In this case, showing a receiver bock or control unit (2) with two channels to which two orientable connectors (3) connect in an orientation position ($P_3$) specific for each one of them, and two connectors without orientation (6) which come out vertically from said receiver block (2).

Figure 14:
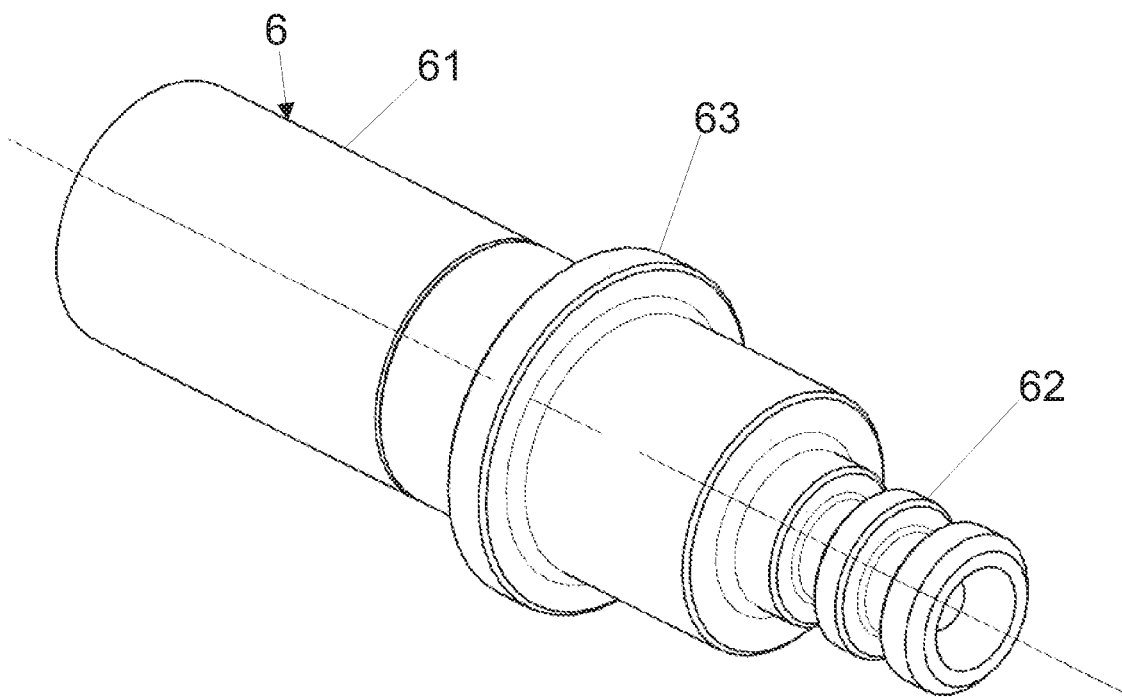
FIG. 14 represents a perspective view of the non-orientable connector of FIG. 12.
Figure 15:
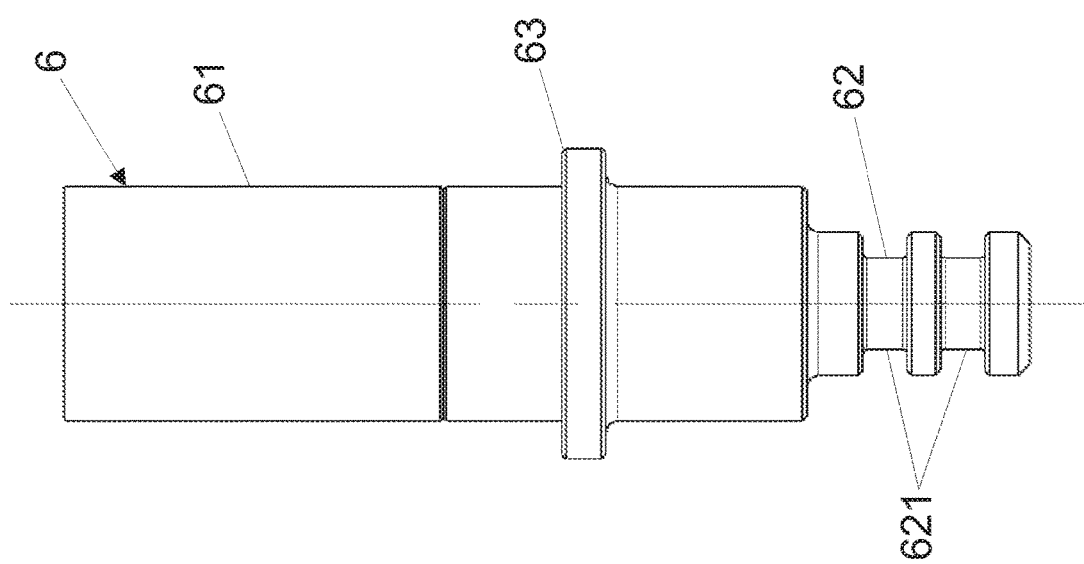
FIG. 15 represents a side view of the non-orientable connector of FIG. 14.

As can be seen in FIGS. 14 and 15, the connector without orientation (6) comprises an input and/or output section (61) and a connection end (62) configured to be inserted into the corresponding connection hole (21) of the receiver block (2) with the aim of establishing hydraulic communication between the receiver block (2) and the connector without orientation (6).

Additionally, the connector without orientation (6) comprises a perimeter ridge (63) which protrudes perpendicularly from the connector without orientation (6) around the same, arranged between the input and/or output section (61) and the connection end (62).

The perimeter ridge (63) is arranged just below the fixing plate (4) once the connectors (3, 6) are connected to the receiver block (2) and the fixing plate (4) fixed to the same. That is to say, also arranged between the fixing plate (4) and the receiver block (2). In this way, the perimeter ridge (63) impedes the connector without orientation (6) being disconnected and/or coming loose from the receiver block (2) in conditions of use. At the same time, the surface of the fixing plate (4) is configured to press against the perimeter ridge (63) to keep the connector without orientation (6) firmly secured to the receiver block (2).

The connection end (62) of the connector without orientation (6) is arranged aligned with respect to the input and/or output section (61).

The connection end (62) comprises one or more circular grooves (621) concentric to its axial axis, configured to house rubber O-rings, not illustrated, configured to ensure the leak-tightness and/or sealing of the connection of the connector without orientation (6) to the receiver block (2).

Figure 16:
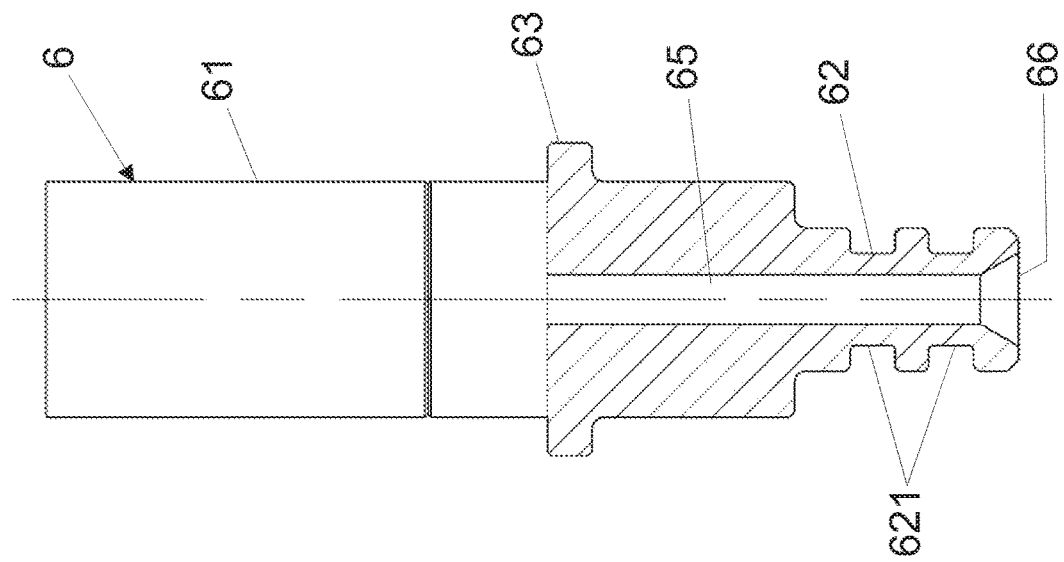
FIG. 16 represents a partially sectioned side view of the non-orientable connector of FIG. 14.

As can be seen in FIG. 16, the connector without orientation (6) comprises interior ducts (65) enabling the circulation of a fluid which allows hydraulic communication to be established between the input and/or output section (61) and the input and/or output mouth (66) arranged at the connection end (62).

Figure 17:
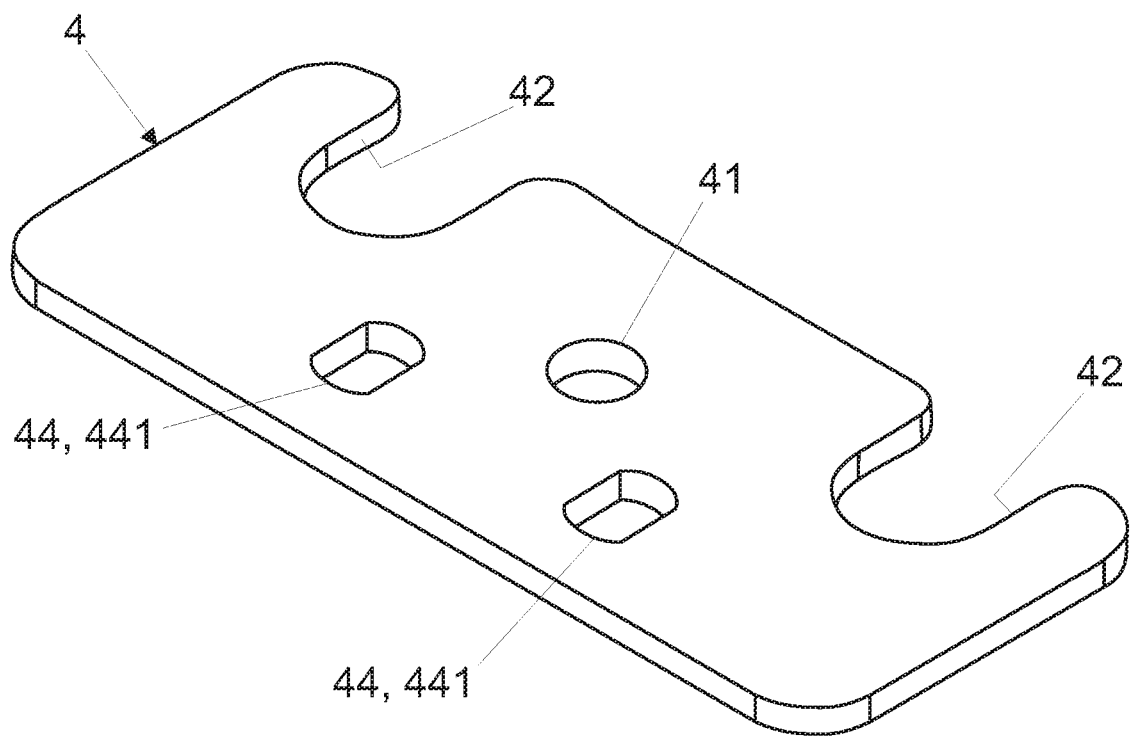
FIG. 17 represents a perspective view of the fixing plate of the connection device of FIG. 12.
Figure 18:
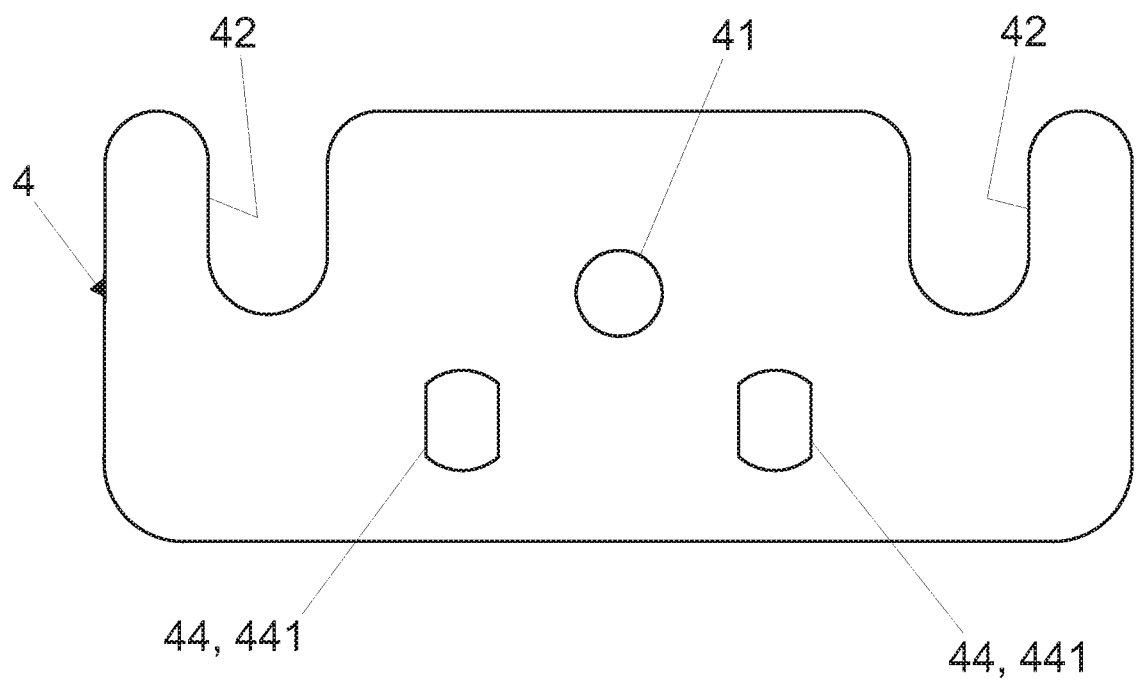
FIG. 18 represents an upper plan view of the fixing plate of FIG. 17.

As can be seen in FIGS. 17 and 18, the fixing plate (4) comprises two openings (42), each one of them configured to receive a connector without orientation (6). The diameter of said openings (42) is smaller than the diameter of the perimeter ridge (63) of the connector without orientation (6) with the aim of ensuring that it is correctly secured.

The openings (42) facilitate the mounting of the fixing plate (4), allowing both the fitting of the orientation means (34, 44) and securing of the perimeter ridge (63) once the connectors (3, 6) are connected to the receiver block (2).

Figure 19:
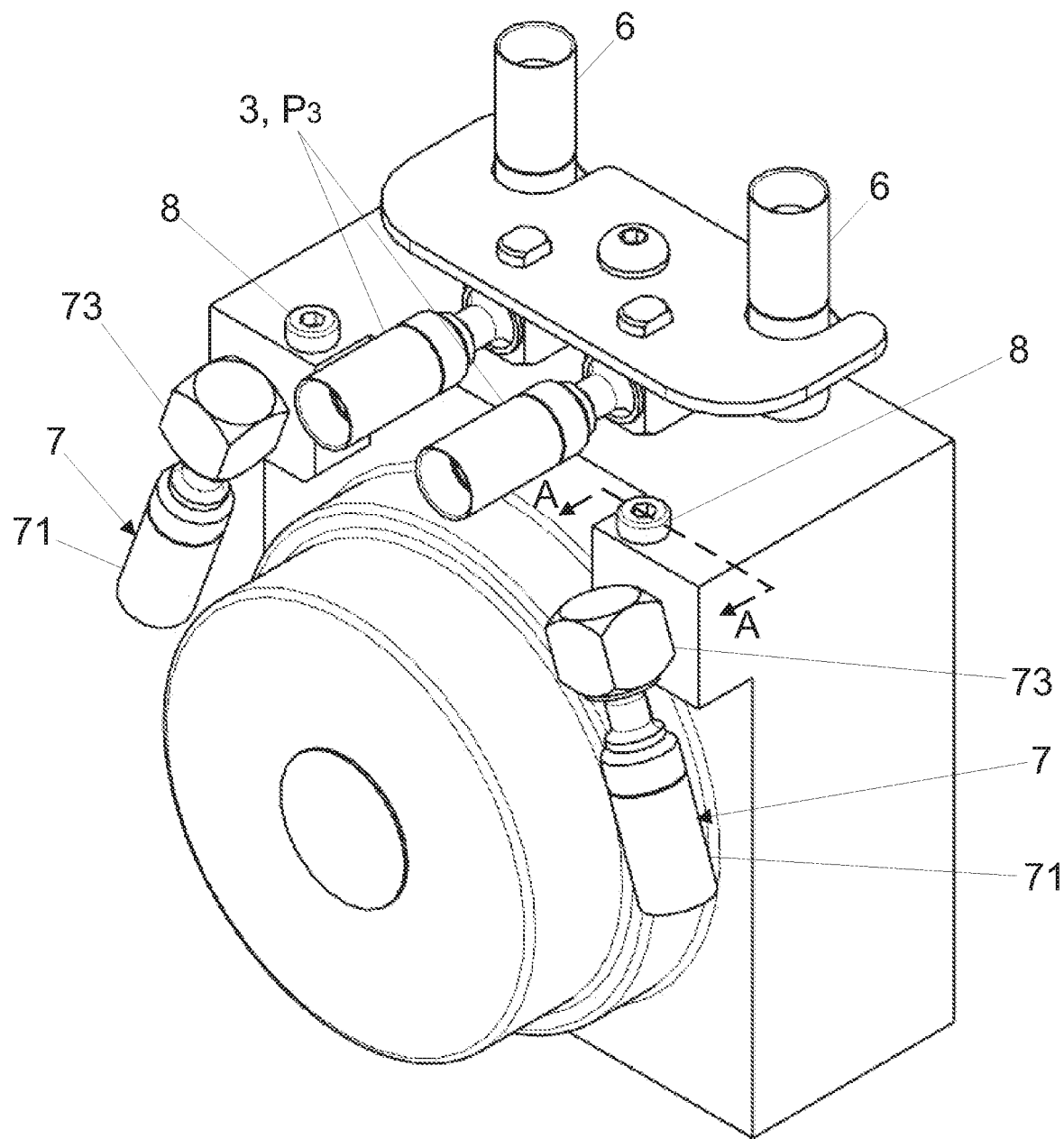
FIG. 19 represents a perspective view of the connection device of the present invention according to a fourth exemplary embodiment.

FIG. 19 represents a perspective view of the connection device (1) for vehicle hydraulic systems of the present invention according to a fourth exemplary embodiment. In this case, showing a receiver block or control unit (2) with three channels to which two orientable connectors (3) connect in an orientation position ($P_3$) specific for each one of them, two connectors without orientation (6) which come out vertically from said receiver block (2), and two auxiliary connectors (7).

In this case, the connection device (1) is complemented by two auxiliary connectors (7) which are connected at the front to the receiver block (2), being retained to the same by means of a retaining element (8).

Figure 21:
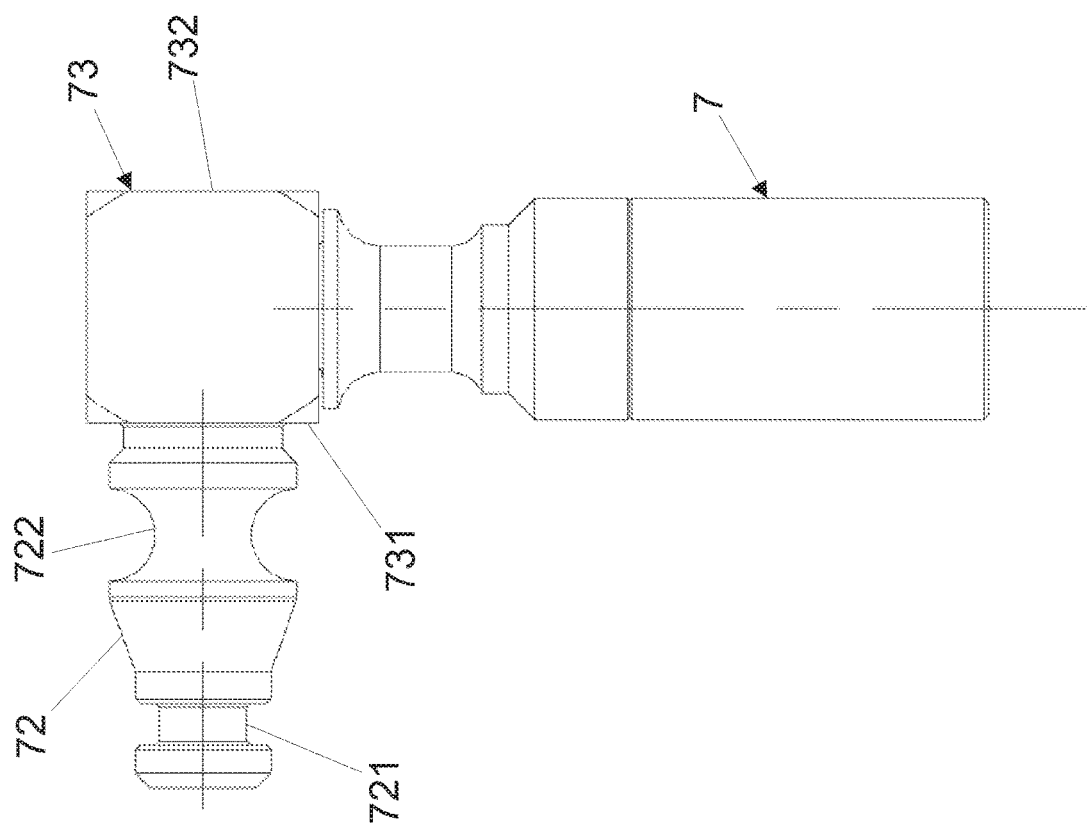
FIG. 21 represents a side view of the auxiliary connector of FIG. 20.
Figure 20:
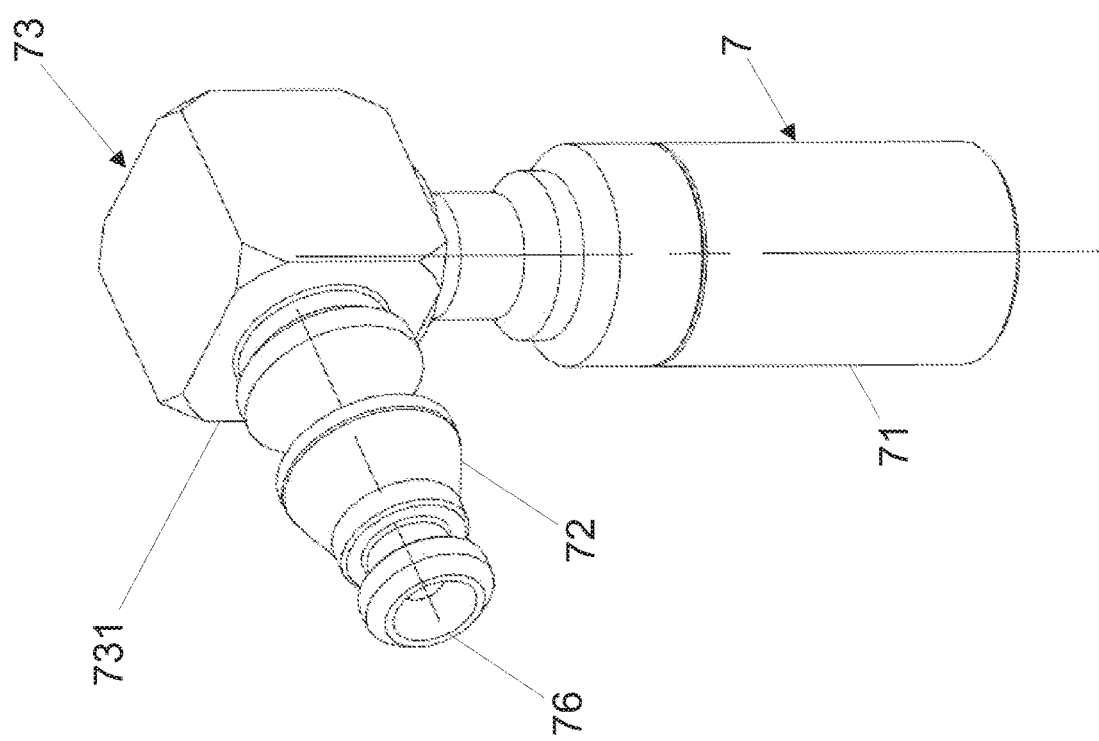
FIG. 20 represents a perspective view of the auxiliary connector of FIG. 19.

As can be seen in FIGS. 20 and 21, the auxiliary connector (7) for connection devices of vehicle hydraulic systems of the present invention comprises an input and/or output section (71) and a connection end (72).

The auxiliary connector (7) comprises a head (73) arranged between the input and/or output section (71) and the connection end (72) configured to establish hydraulic communication between both (71, 72). According to the present example, the head (73) has a substantially cube configuration, The head (73) comprises a flat support surface (731) from which the connection end (72) extends perpendicularly and a flat face (732), opposite the flat support face (731).

The connection end (72) of the auxiliary connector (7) is arranged substantially perpendicular with respect to the input and/or output section (71).

The connection end (72) comprises one or more circular grooves (721) concentric to its axial axis, configured to house rubber O-rings, not illustrated, configured to ensure the leak-tightness and/or sealing of the connection of the auxiliary connector (7) to the receiver block (2).

Figure 23:
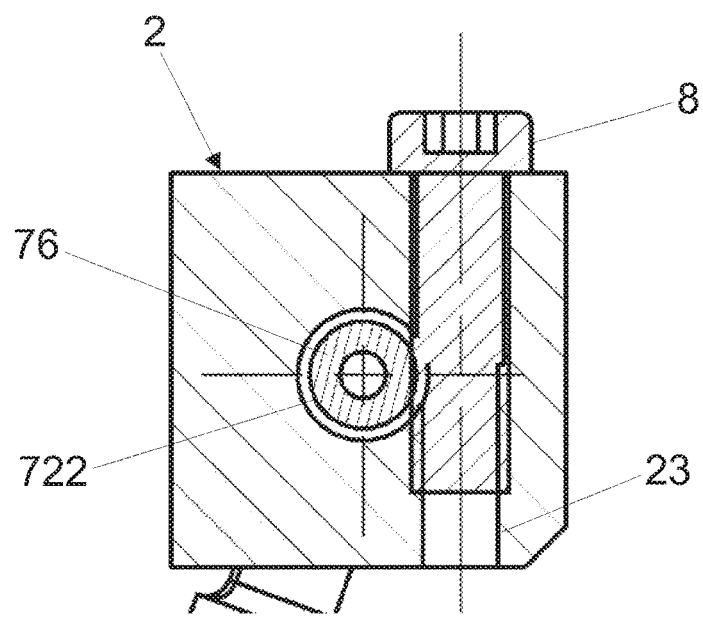
FIG. 23 represents a transverse section of the receiver block along the A-A cut line of FIG. 19.

The connection end (72) also comprises a circular groove (722) concentric to the axial axis configured to partially house the retaining element (8), FIG. 23.

Figure 22:
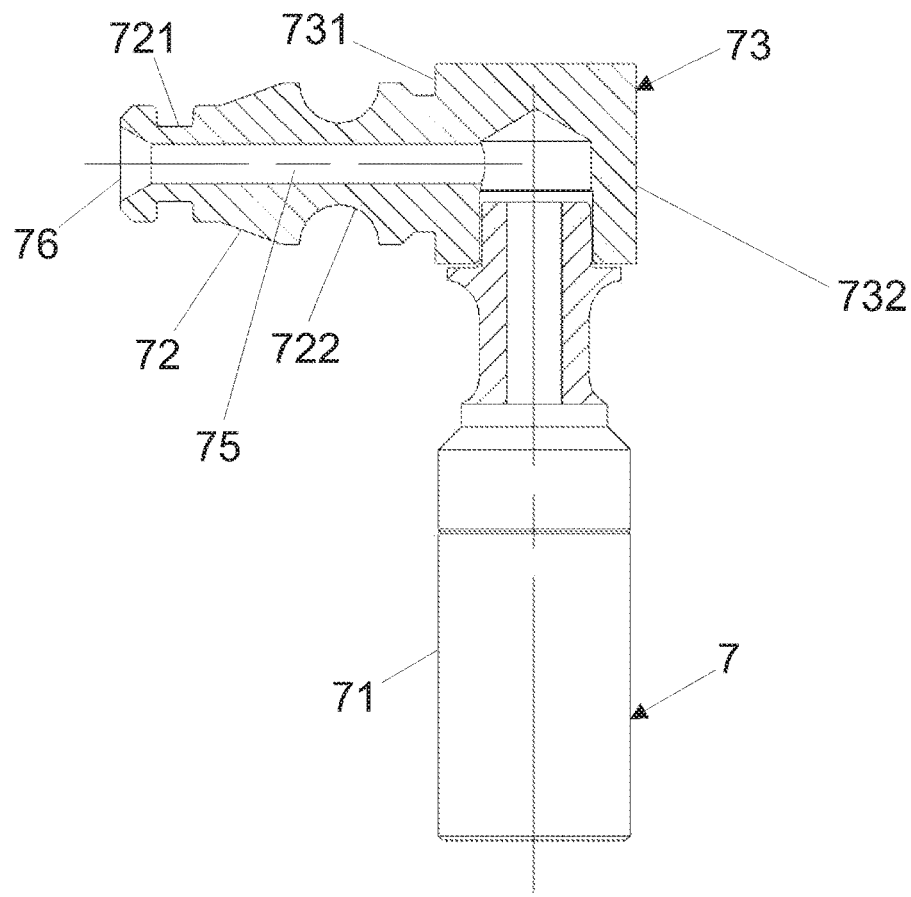
FIG. 22 represents a partially sectioned side view of the auxiliary connector of FIG. 20.

As can be seen in FIG. 22, the auxiliary connector (7) comprises interior ducts (75) enabling the circulation of a fluid which allows hydraulic communication to be established between the input and/or output section (71) and the input and/or output mouth (76) arranged at the connection end (72).

As can be seen in FIG. 23, the circular groove (722) is configured to partially house the retaining element (8), whilst the other part of said retaining element (8) is housed in a connector hole (23) of the receiver block (2). Therefore, the retaining element (8) keeps the auxiliary connector (7) attached to the receiver block (3) once they are connected.

Figure 24:
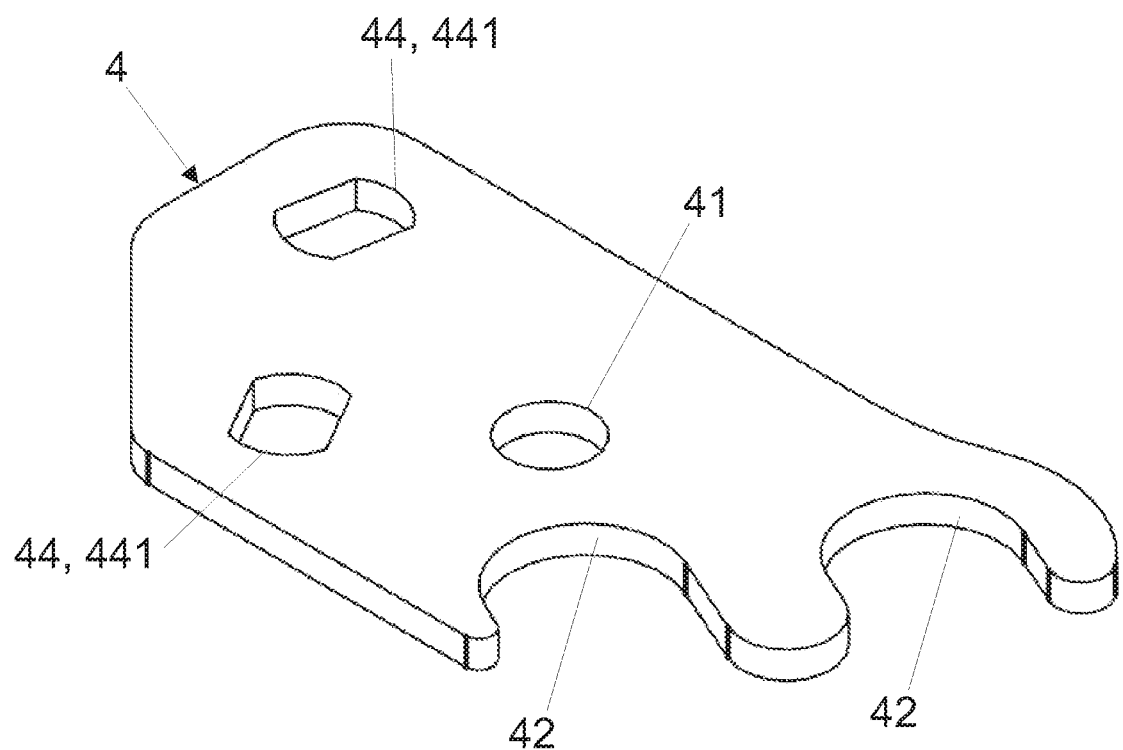
FIG. 24 represents a perspective view of the fixing plate of the connection device according to a particular case.

FIG. 24 shows a perspective view of the fixing plate (4) of the connection device (1) according to a particular case. Specifically, providing the complementary orientation means (44) for orientable connectors (3) at an end of the fixing plate (4) and the openings (42) for connectors without orientation (6) at the other end, leaving the through-hole (41) in the middle.

Figure 25:
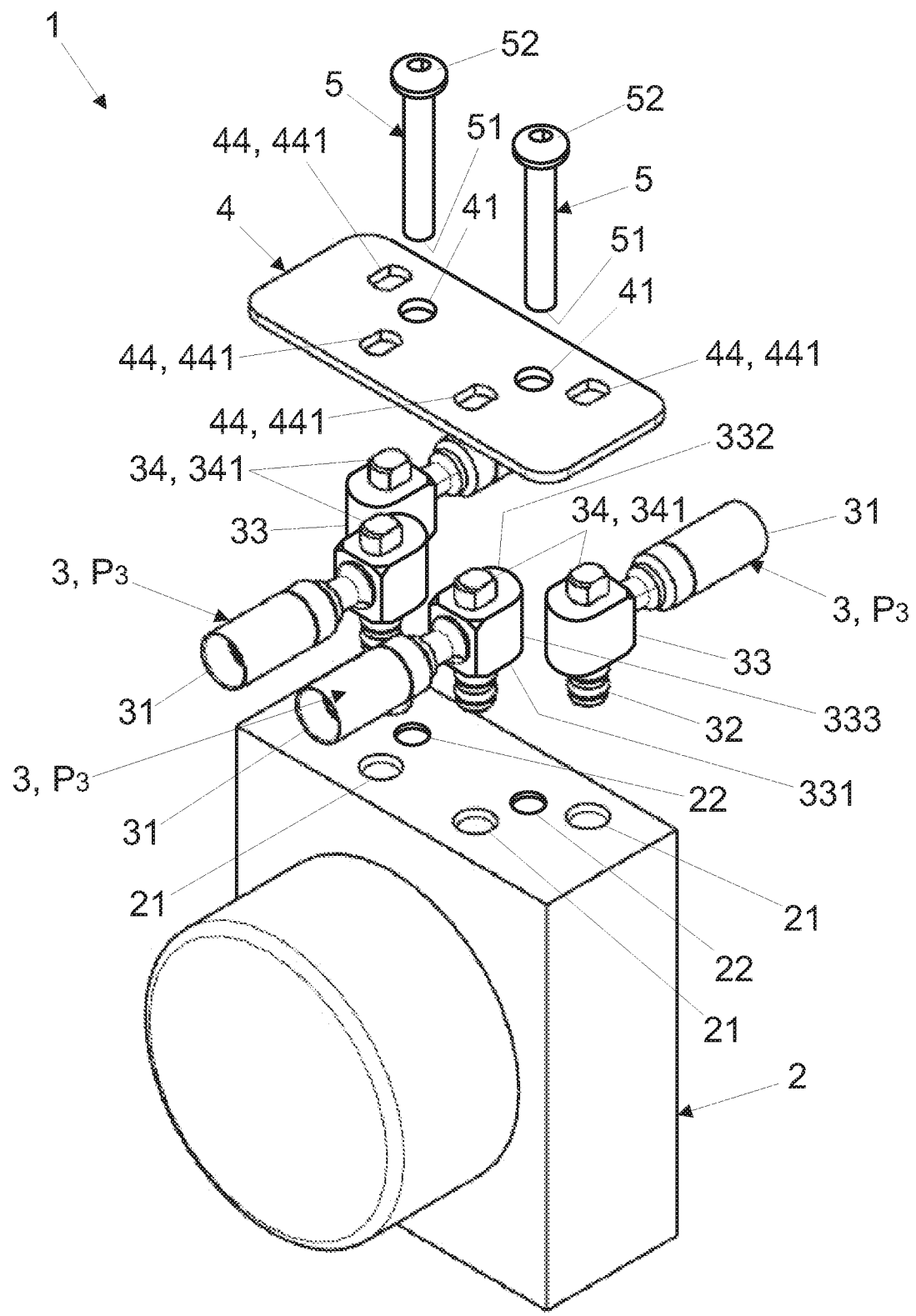
FIG. 25 represents an exploded view of the connection device of the present invention according to a fifth exemplary embodiment.

FIG. 25 shows an exploded view of the connection device (1) for vehicle hydraulic systems of the present invention according to a fifth exemplary embodiment. In this case, showing a receiver block or control unit (2) with two channels to which four orientable connectors (3) connect in an orientation position ($P_3$) specific for each one of them. In which two fixing screws (5) are also used to fix the fixing plate (4) to the receiver block (2).

According to the present exemplary embodiment, the head (33) of each orientable connector (3) also comprises a curved side face (333) arranged between the flat support face (331) and the flat orientation face (332). This allows a greater space to be generated between the heads (33) so that the fixing screws (5) fit.

Figure 26:
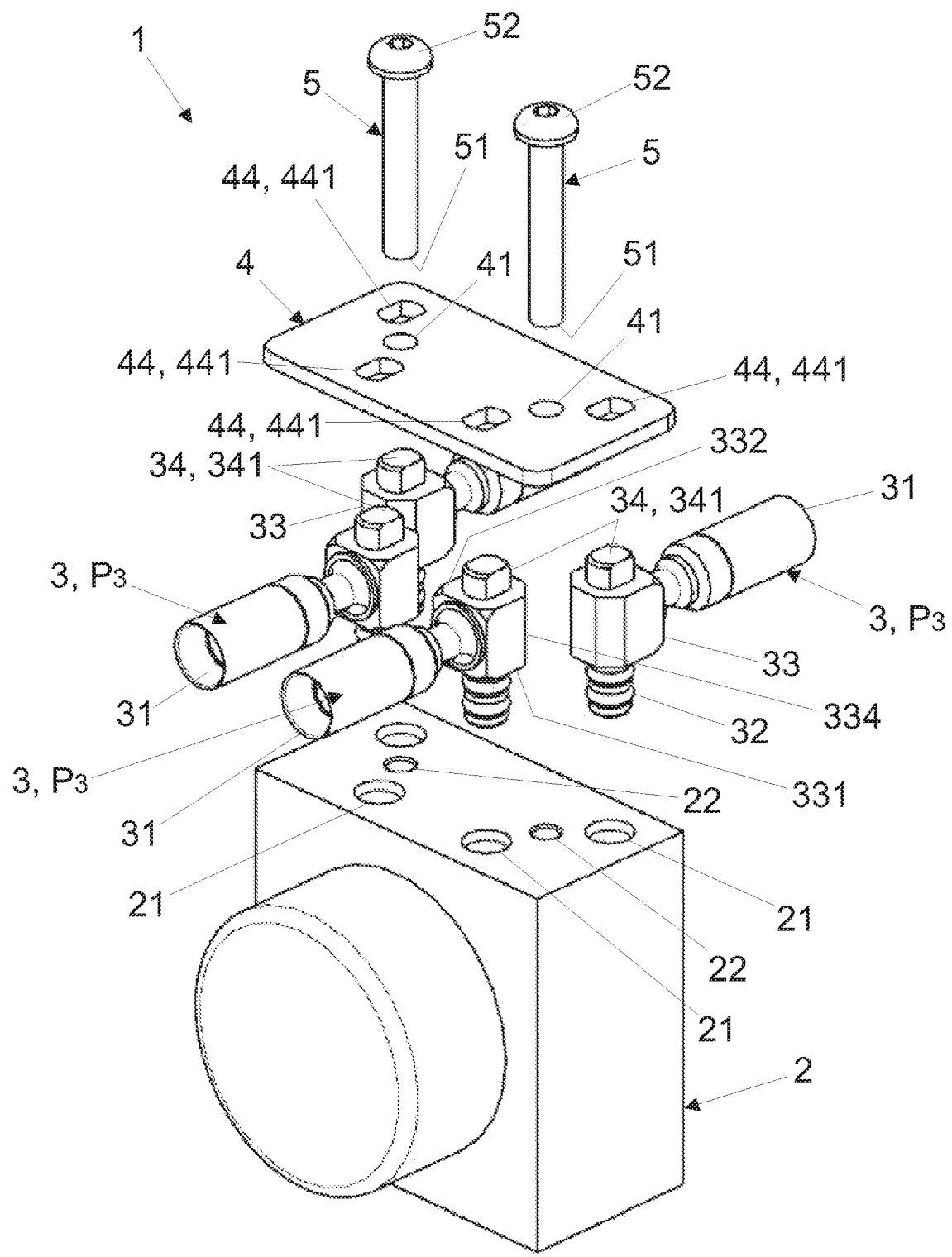
FIG. 26 represents an exploded view of the connection device of the present invention according to a sixth exemplary embodiment.

FIG. 26 shows an exploded view of the connection device (1) for vehicle hydraulic systems of the present invention according to a sixth exemplary embodiment. In this case, showing a receiver block or control unit (2) with two channels to which four orientable connectors (3) connect in an orientation position ($P_3$) specific for each one of them. In which two fixing screws (5) are also used to fix the fixing plate (4) to the receiver block (2).

According to the present exemplary embodiment, the head (33) of each orientable connector (3) has a substantially hexagonal shape or at least a tapered side face (334) with the aim of generating a greater space between the heads (33) so that the fixing screws (5) fit.

For all the embodiments of the connection device (1) previously described, the method of assembly of the present invention has at least the following steps in common:
  a) inserting the connection end (32) of an orientable connector (3) into a connection hole (21) of the receiver block (2) to establish hydraulic communication between the receiver block (2) and the orientable connector (3);
  a1) repeating step a) for the rest of the orientable connectors (3); and
  b) fixing the orientable connectors (3) to the receiver block (2) by means of the fixing plate (4).

Where step b) comprises the following steps:
  b1) arranging the heads (33) of the orientable connectors (3) between the fixing plate (4) and the receiver block (2);
  b2) fitting the orientation means (34) of the heads (33) with the complementary orientation means (44) of the fixing plate (4) to establish an orientation position ($P_3$) of each orientable connector (3); and
  b3) fixing the fixing plate (4) to the receiver block (2), the orientable connectors (3) being in the orientation position ($P_3$).

And where step b2) comprises the following step:
  b2.1) fitting each protruding element (341) of the orientation means (34) in an orientation hole (441) of the complementary orientation means (44) without the possibility of said orientable connectors (3) rotating once fitted.

The invention claimed is:

1. A connection device for vehicle hydraulic systems comprising:
   a receiver block which has or more connection holes;
   at least one orientable connector which has an input and/or output section and a connection end configured to be inserted into a connection hole to establish hydraulic communication between the receiver block and the orientable connector; and
   a fixing plate configured to fix the orientable connector to the receiver block,
   wherein the at least one orientable connector comprises a head provided with orientation means arranged between the input and/or output section and the connection end;
   wherein the fixing plate comprises complementary orientation means configured to fit with the orientation means of the head to fix an orientation position of the orientable connector, the head being arranged between the fixing plate and the receiver block;
   wherein the head further comprises:
      a flat support face from which the connection end perpendicularly extends; and
      a flat orientation face, opposite the flat support face, on which the orientation means are located, and
   wherein the receiver block is a control unit of a wheel anti-lock braking system (ABS) or a control unit of a stability control system of a vehicle.

2. The device according to claim 1, wherein the head comprises at least one curved or tapered side face arranged between the flat support face and the flat orientation face.

3. The device according to claim 1, wherein the orientation means comprise a protruding element; and in that the complementary orientation means comprise an orientation hole, where the protruding element is configured to fit into the orientation hole in the orientation position of the orientable connector without the possibility of said orientable connector rotating once fitted.

4. The device according to claim 1, wherein the connection end is arranged perpendicularly with respect to the input and/or output section.

5. The device according to claim 1, wherein the receiver block comprises one or more threaded holes, each one configured to allow the threading of a first end of a fixing screw; and in that the fixing plate comprises one or more through-holes, each one configured to allow the passage of the first end of a fixing screw and retain a second end of said fixing screw.

6. The device according to claim 1, wherein the fixing plate comprises at least one opening configured to receive a connector without orientation.

7. A method of assembly of a connection device according to claim 1, comprising the steps of:
- a) inserting the connection end of the orientable connector into a connection hole of the receiver block to establish hydraulic communication between the receiver block and the orientable connector; and
- b) fixing the orientable connector to the receiver block by means of the fixing plate;

wherein the step b) further comprises the following steps:
- b1) arranging the head of the orientable connector between the fixing plate and the receiver block;
- b2) fitting the orientation means of the head with the complementary orientation means of the fixing plate to establish an orientation position of the orientable connector; and
- b3) fixing the fixing plate to the receiver block, the orientable connector being in the orientation position.

8. The method of assembly according to claim 7, wherein step b2) further comprises the following step:
- b2.1) fitting a protruding element of the orientation means into an orientation hole of the complementary orientation means without the possibility of said orientable connector rotating once fitted.

* * * * *